United States Patent [19]
Okada

[11] Patent Number: 4,858,440
[45] Date of Patent: Aug. 22, 1989

[54] TURBO-COMPOUND ENGINE

[75] Inventor: Masaki Okada, Kawasaki, Japan

[73] Assignee: Isuzu Motors Limited, Tokyo, Japan

[21] Appl. No.: 199,552

[22] Filed: May 27, 1988

[30] Foreign Application Priority Data

May 30, 1987 [JP] Japan ............................... 62-136477

[51] Int. Cl.⁴ .............................................. F02G 5/00
[52] U.S. Cl. ........................................ 60/614; 60/624
[58] Field of Search ................ 60/607, 608, 624, 614

[56] References Cited

U.S. PATENT DOCUMENTS

| | | | |
|---|---|---|---|
| 2,197,179 | 4/1940 | Hersey | 60/608 |
| 2,819,765 | 1/1958 | Chatterton | 60/608 X |
| 4,445,337 | 5/1984 | McCreary | 60/608 |
| 4,748,812 | 6/1988 | Okada et al. | 60/624 X |
| 4,800,726 | 1/1989 | Okada et al. | 60/614 |

FOREIGN PATENT DOCUMENTS

| | | | |
|---|---|---|---|
| 61-921 | 3/1986 | Japan | 60/624 |
| 3131 | 1/1987 | D.P.R. of Korea | 60/624 |

*Primary Examiner*—Michael Koczo
*Attorney, Agent, or Firm*—Dykema Gossett

[57] ABSTRACT

A turbo compound engine constructed in a manner such that the crankshaft of the engine and a power turbine disposed in the exhaust gas passage are connected to each other by a gear train during exhaust braking with the rotation of the crankshaft being transmitted to the power turbine. The power turbine imposes a negative work on the crankshaft as a braking force. A speed-change mechanism is provided in the gear train to adjust the transmitting revolution speed from the crankshaft to the power turbine and is controlled by a controller based on driving conditions of the vehicle, so that a suitable braking force is applied to the crankshaft.

9 Claims, 7 Drawing Sheets

Throttling

Power turbine rotating speed

1

TURBO-COMPOUND ENGINE

BACKGROUND OF THE INVENTION

1. Field of the Invention

The present invention relates to a turbo compound engine that is capable of recovering the energy of exhaust gas as an expansion work of the turbine and utilizing the recovered energy as rotative power of a drive shaft such as a crank shaft. In particular, it concerns a turbo compound engine that is capable of generating an optimum and minimum engine braking force in accordance with the running condition of the engine.

2. Background Art

Generally, supercharged engines have advantages in comparison with non-supercharged engines of larger displacements: (1) better fuel consumption rate, (2) equal or better output performance, and (3) lighter weight and compactness.

A turbo compound engine is an engine in which the above advantages are further augmented. In the turbo compound engine, the energy of exhaust gas from the engine is recovered by the turbocharger as its supercharging work, and the remaining energy of the exhaust gas from the turbocharger is recovered by the power turbine as its adiabatic expansion work. This construction brings about a general improvement in the power output performance, fuel consumption rate, and gain of the engine. Further, the turbo compound engine's overall performance or its serviceability can be further ameliorated by increasing the expansion ratios of the turbocharger and the power turbine so as to raise its supercharging pressure.

In this case, however, it remains a problem to secure an adequate braking effort (for example, by means of exhaust braking) to counterbalance the increased power output of the engine. In other words, as a relative engine braking force suffers a decrease because of increased turbocharged pressure, a main brake (i.e., foot brake) should be manipulated in order to offset the relative decrease of entire braking force.

Obtaining a sufficiently large engine brake force is important not only for the maneuverability and safety of the vehicle (engine brake force of approximately more than 60% of the rated output power is required), but also for taking better advantage of the advantages of the turbo compound engine. Thereupon, the present assignee has proposed a "Turbo Compound Engine" disclosed in Japanese Patent Application No. 61-308776 which is included herein by reference.

In this proposal, as shown in FIG. 6 of the accompanying drawings, a power turbine a and a crankshaft b are connected to each other by a gear train d, which has an electromagnetic clutch c, so as to transmit the rotation of the crankshaft to the power turbine a. Said electromagnetic clutch is connected upon exhaust braking. The gear ratio of the gear train d is set smaller than that of the gear train e that transmits the rotative force of the power turbine to the crankshaft b when the exhaust brake is not operated.

The exhaust brake is generally manipulated even when the engine is running beyond the rated revolution speed. In this case, there is a substantial possibility that the power turbine may go into an overrun condition. Therefore, in the above proposal, during exhaust braking, the electromagnetic clutch is actuated so as to transmit the rotation of the crankshaft to the power turbine, rotating the power turbine in the reverse sense.

In this manner, compared with the gear ratio of the gear train which transmits the rotation from the power turbine to the crankshaft when the exhaust brake is not operated, the gear ratio of the other gear train which transmits the rotation from the crank gear to the power turbine is set small, so that the overrun of the power turbine upon exhaust braking is prevented.

Also according to the above idea, the power turbine functions as a compressor, and the inlet line of the power turbine is throttled to a certain degree in order to acquire a braking force corresponding to the degree of throttling of the inlet line as depicted in FIG. 7. In this case, however, the throttling of the inlet line is fixed. Hence, a characteristic or an advantage that the braking force varies with the revolution speed of the power turbine is not utilized effectively. FIG. 8 shows that the braking force increases with the revolution speed of the power turbine. Therefore, it is desirable to obtain an appropriate braking effort in accordance with the revolution speed of the power turbine.

In addition, according to the construction of the above proposal, it is possible to obtain an energy absorption force as braking force of more than one-third of the engine horsepower at an optimum throttling. However, if the whole of the acquired braking force works at the same time when the vehicle is running, the following difficulties will arise:

(1) the vehicle skids momentarily;
(2) an anti-driving force upon skidding exerts an extremely large load on the driving system of the vehicle; and
(3) an abnormal abrasion of tires, brake pads and shoes occurs.

SUMMARY OF THE INVENTION

One object of this invention is to provide a device which produces an exhaust brake force of suitable magnitude during exhaust braking in relation to the driving condition as well as the total weight of the vehicle so that the anti-driving force which might damage the driving system of the vehicle, and the skidding, do not happen, thereby remarkably improving the reliability and the durability of the braking system. In order to attain the above object, a turbo compound engine of the present invention includes a gear train for connecting the crankshaft of the engine and the power turbine disposed in the exhaust passage to transmit the rotation of the crankshaft to the power turbine to speed-change means for changing the transmitting revolution speed of the gear train, and a controller for controlling the speed-change means based on driving condition of the vehicle.

BRIEF DESCRIPTION OF THE DRAWINGS

FIG. 5b is a partial flow chart of the controller which controls the non-stage transmission mechanism and completes the flow chart of FIG. 5a.

DESCRIPTION OF THE PREFERRED EMBODIMENTS

A preferred embodiment of the turbo compound engine of the present invention will be described with reference to the accompanying drawings.

Figure 1:
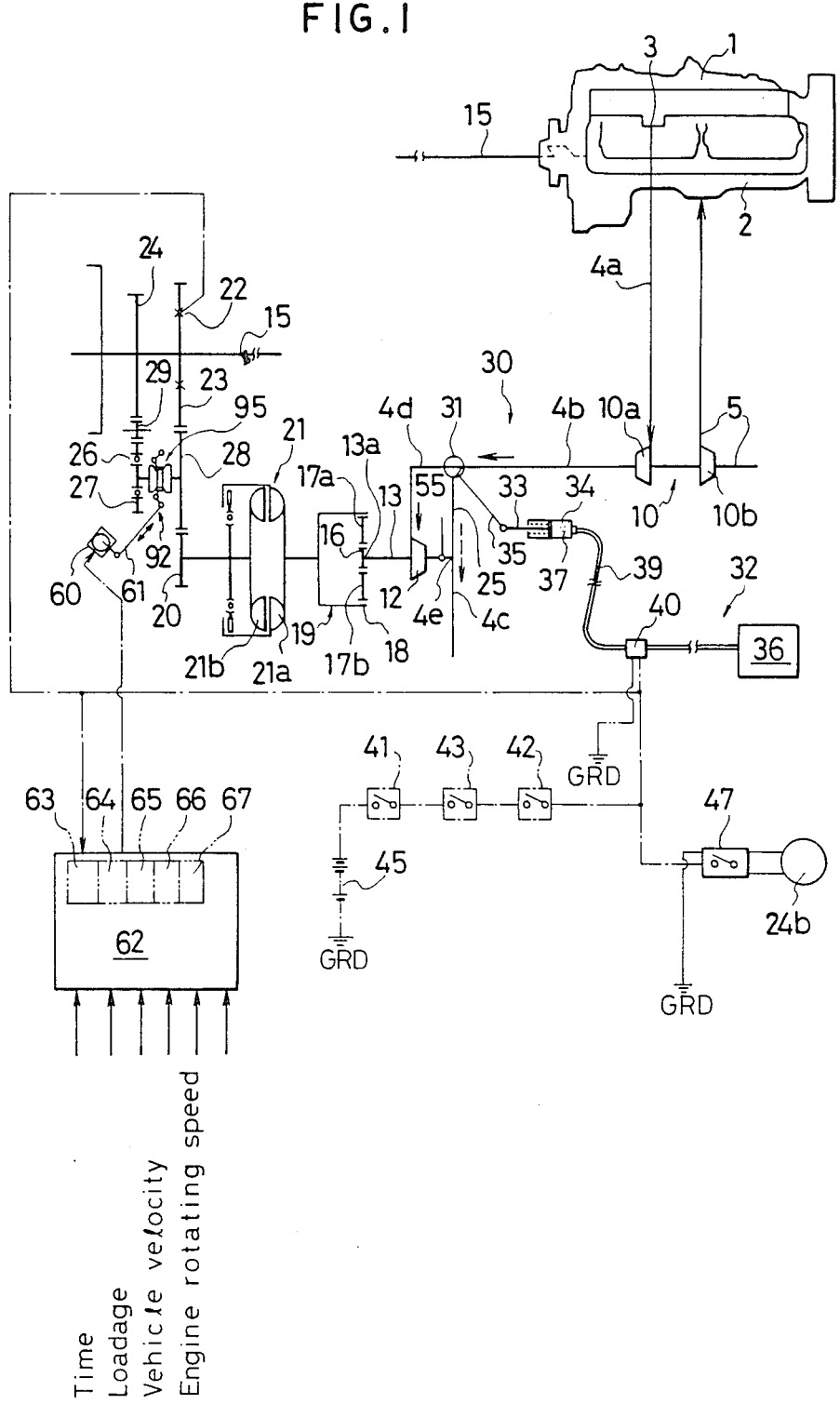
FIG. 1 is a system diagram, showing a preferred embodiment of the turbo compound engine of the present invention.

In FIG. 1, 1 indicates an engine, 2 the intake manifold, and 3 the exhaust manifold.

As depicted in FIG. 1, an exhaust gas passage 4a is connected to the exhaust manifold 3, and to the intake manifold 2 there is connected an intake air passage 5.

The turbine 10a of the turbocharger 10 is disposed at an intermediate point in the exhaust passage 4a, while the compressor 10b of the turbocharger 10 is disposed at an intermediate point in the intake passage 5. In an exhaust passage 4b downstream of the turbocharger 10, a power turbine 12 is disposed.

The turbo compound engine of this invention is intended to secure an adequate engine braking force relative to the engine output performance. In order to increase the engine braking force, it has been found that a resistance force should be applied to the crankshaft 15 directly or indirectly which is effective to load the crankshaft 15 with considerable negative work.

The turbo compound engine of this invention is constructed so that the power turbine 12 is reversed during exhaust braking, letting the power turbine 12 cause a large negative work.

As shown in FIG. 1, a fluid passage 25 is connected to the exhaust gas passage 4b between the power turbine 12 and the turbine 10a of the turbocharger 10 at one end, and at the other end to the passage 4c downstream of the power turbine 12. At the junction of the fluid passage 25 upstream of the power turbine 12, there is provided a passage switching means 30.

Figure 3:
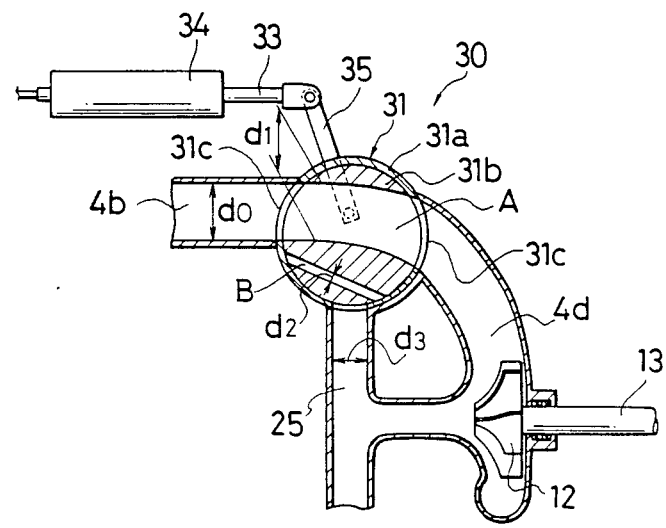
FIG. 3 is an enlarged view of a part of FIG. 1, showing a rotary valve switched to a position to recover the motive power of the power turbine.
Figure 4:
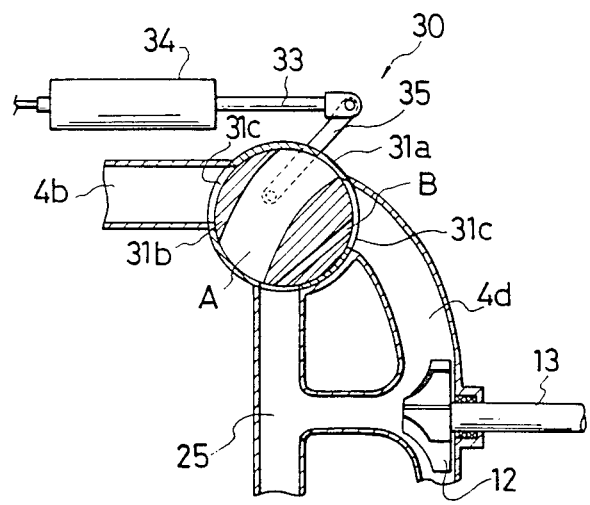
FIG. 4 is an enlarged view, showing the rotary valve switched to a position at which a braking force is produced by the power turbine.
Figures 1, 5A:
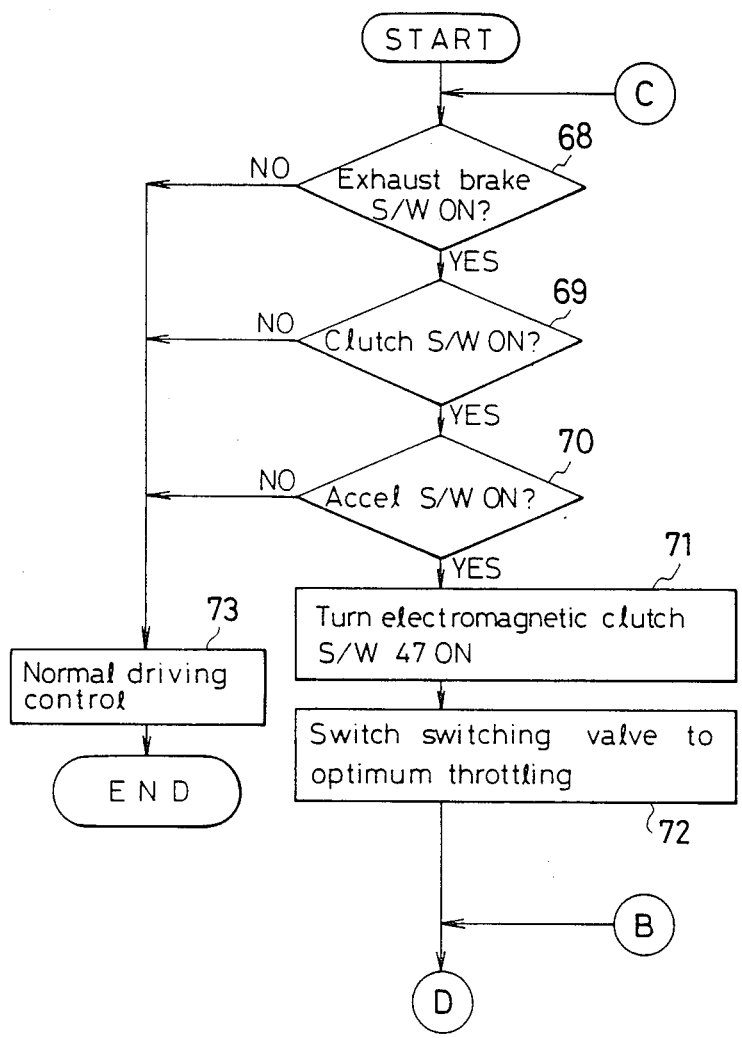
FIG. 5A is a partial flow chart of the controller which controls the non-stage transmission mechanism.
Figures 2, 5A:
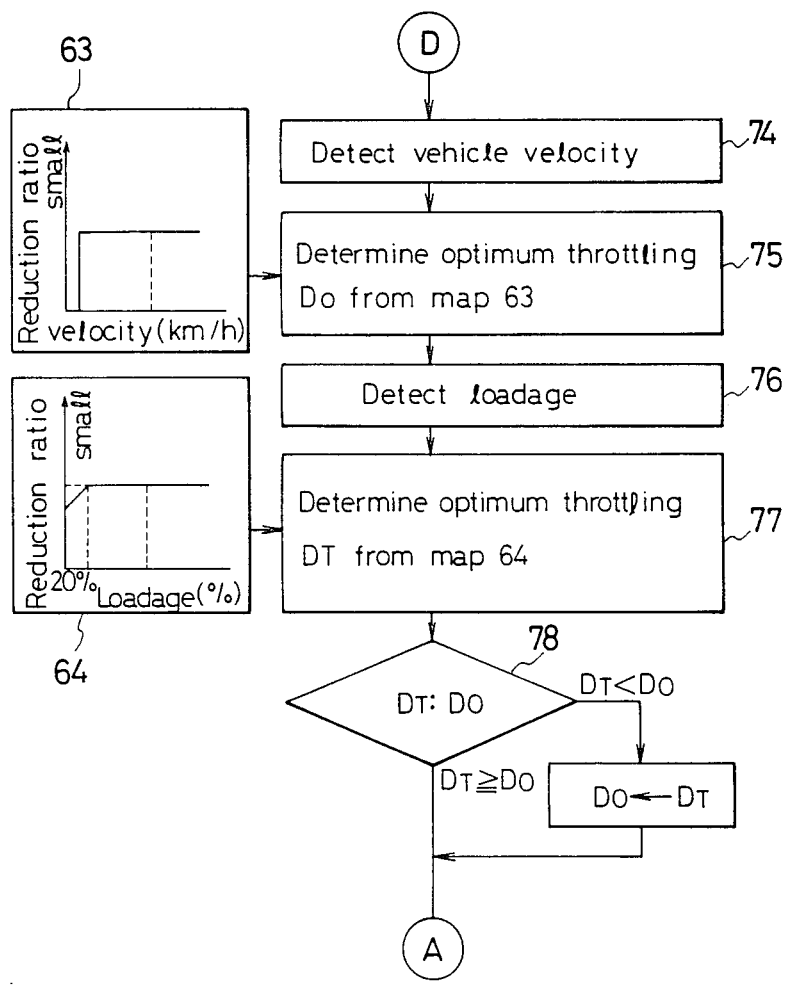
Figures 1, 5B:
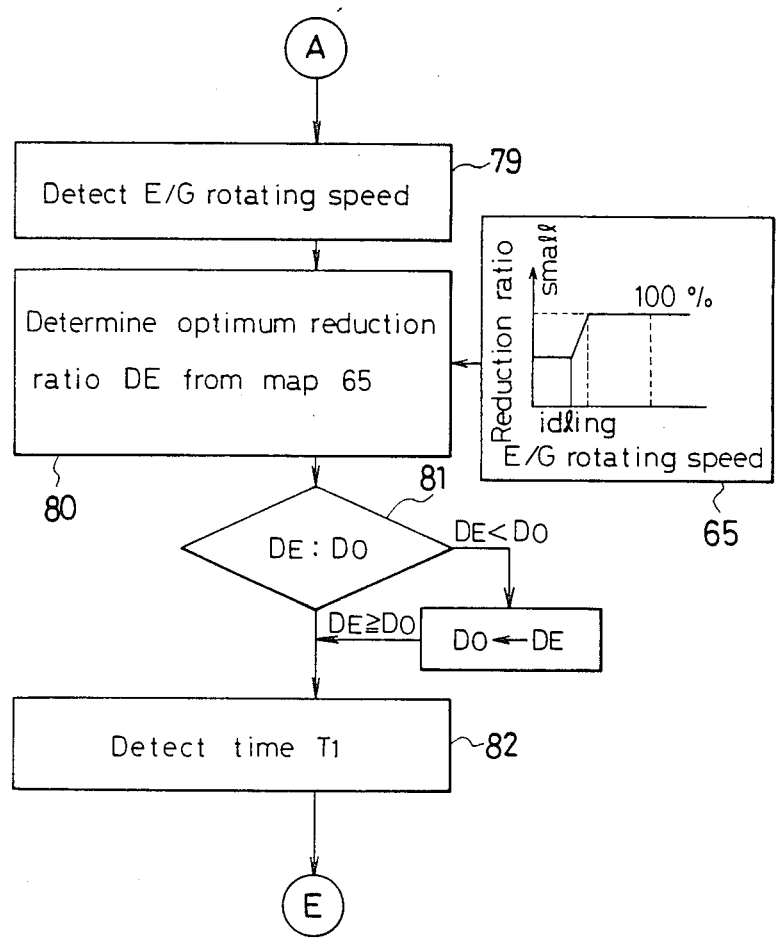
Figures 2, 5B:
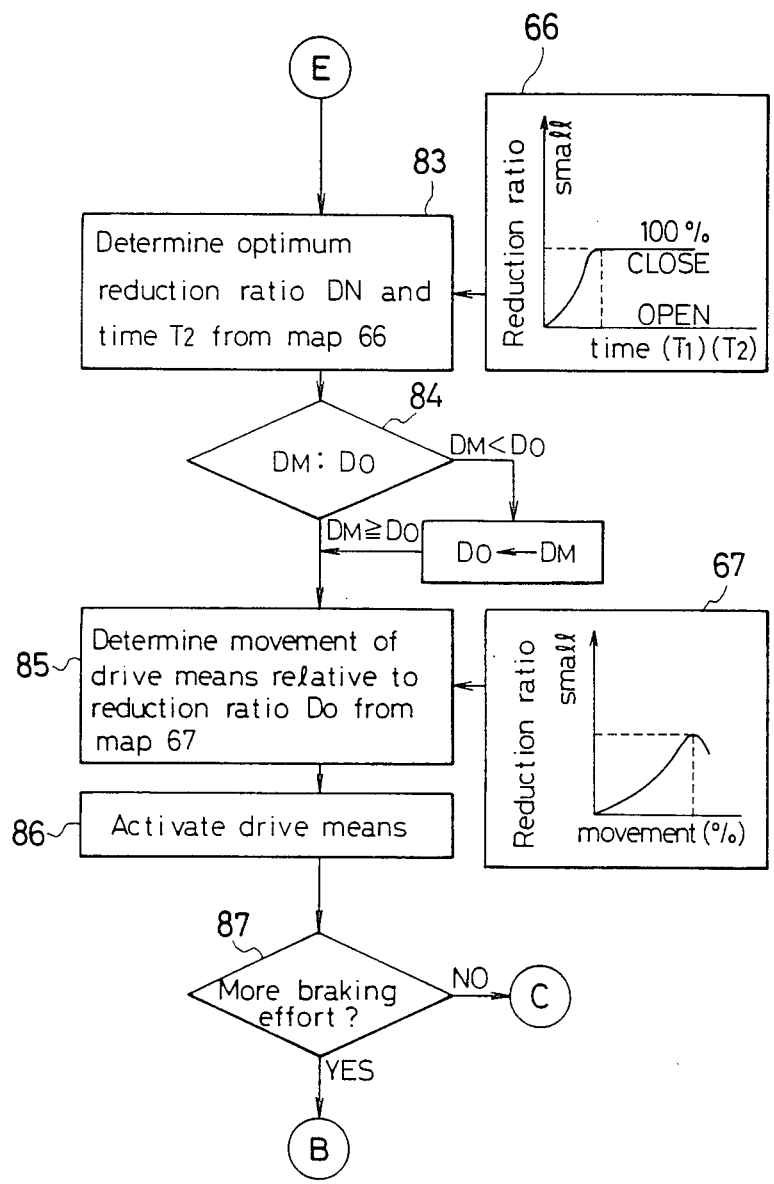
Figure 6:
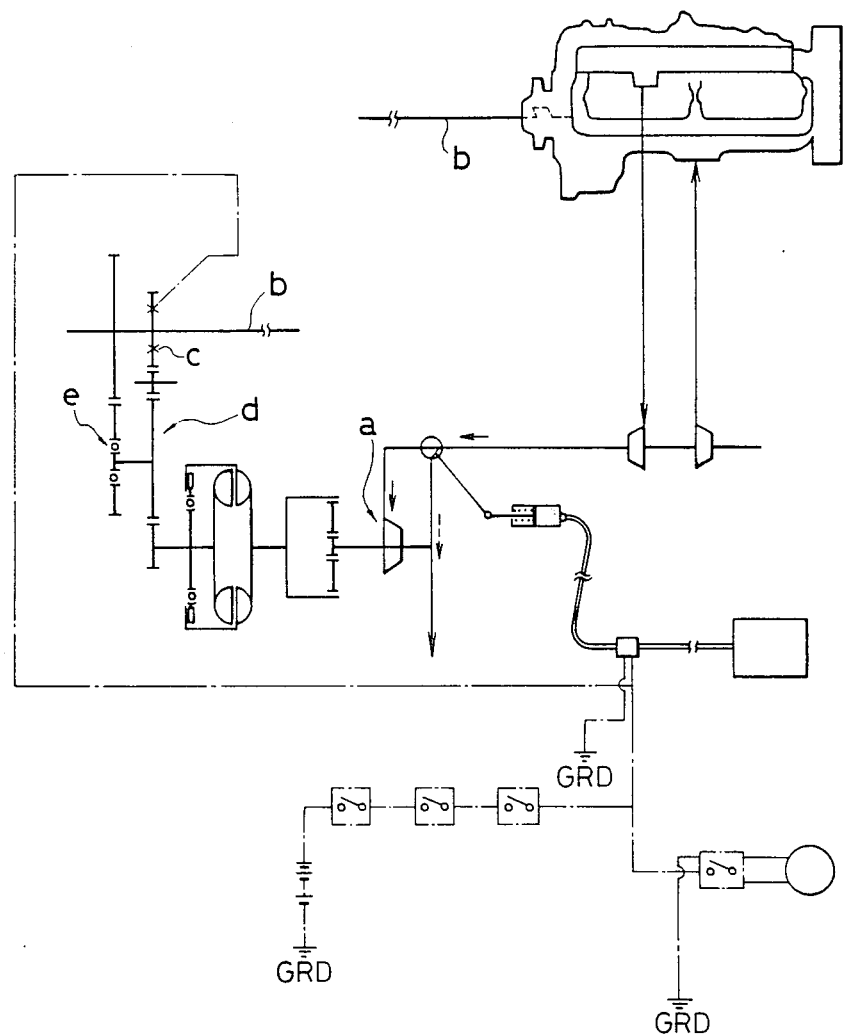
FIG. 6 is a system diagram, depicting a turbo compound engine of related art.
Figure 7:
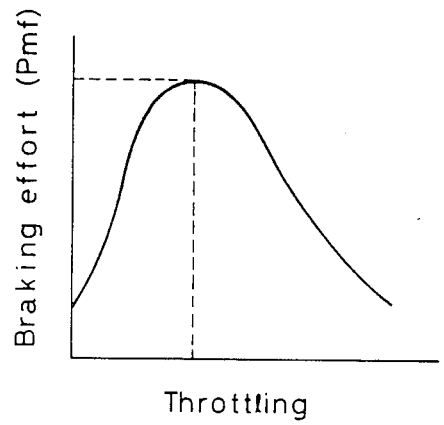
FIG. 7 depicts a characteristic curve, showing a relationship between degree of throttling of the exhaust passage and braking force against the engine, that is to say, engine braking force.
Figure 8:
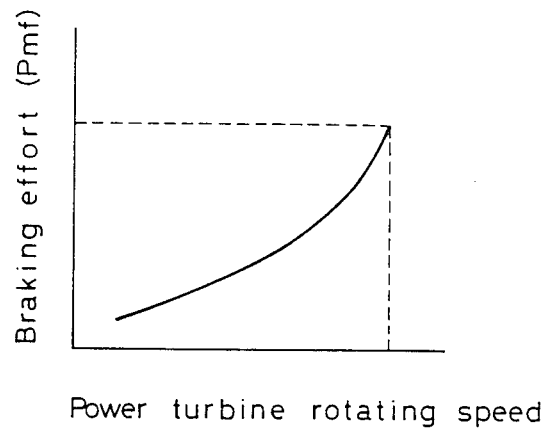
FIG. 8 depicts a characteristic curve, showing a relationship between the revolution speed of the power turbine and the engine braking force.

In this embodiment, the passage switching means 30, as shown in FIGS. 1, 3 and 4 includes a rotary valve 31, which is disposed in the above-mentioned junction and functions as a switching valve, and an actuation mechanism 32 for operating the rotary valve 31. The rotary valve 31 comprises, as depicted in FIGS. 3 and 4, a rotor 31b which is rotatably disposed in the casing 31a, a first port A, and a second port B, both being formed within the rotor 31b in a manner such that the diameter of the first port A, d1, is equal to that of the exhaust passage 4b, d0, while the diameter of the second port B, d2, is smaller than that of the passage 25, d3. In the casing 31a, openings 31c are formed as parts of the exhaust passage 4b. The rotation positions of the first port A and the second port B are determined in a manner such that when the exhaust passage 4b and the first port A are connected to each other, the exhaust passage 4b and the fluid passage 25 are disconnected, as shown in FIG. 3.

The actuation mechanism 32 that switches and controls the rotary valve 31 is constructed as follows. As shown in FIGS. 1, 3 and 4, to the rotor 31b there is connected one end of a lever member 35, with the opposite end of lever member 35, the namely that end which extends out of the exhaust passage 4b in the radial direction, there is connected the actuating rod 33 of the actuator 34.

In FIG. 1, 36 indicates a fluid feeding apparatus which is connected to the actuating chamber 37 of actuator 34 by the fluid feeding passage 39. Approximately midway in the fluid passage 39, there is disposed an electromagnetic valve 40 that connects the fluid chamber 37 and the fluid feeding apparatus when electric current is supplied thereto. The electric current is supplied to the electromagnetic valve 40 only when the neutrality sensing switch 41 of the engine 1, the clutch action switch or electromagnetic clutch switch 42, and the exhaust brake switch 43 are all turned ON. 45 designates a DC power source such as a battery.

Numeral 47 denotes a switch for reverse rotation of the electromagnetic clutch which has a normal open contact point.

Next, a gear train for connecting the power turbine 12 and the crankshaft 15 will be explained. Referring to FIG. 1, to the end 13a of the turbine shaft 13 of the power turbine 12, there is integrally provided an output gear 156 with which epicyclic gearing 19 is engaged. The gearing 19 includes epicyclic or planetary gears 17a and 17b which are engaged with a ring gear 18 that rotates with an input pump wheel 21a of the fluid coupling 21.

The output gear 16 is connected to the fluid coupling 21 via the epicyclic gearing 19 which comprises the planetary gears 17a and 17b as well as the ring gear 18, so that the rotative force from the power turbine 12 can be transmitted to the output pump 21b of the fluid coupling 21. The epicyclic gearing 19 is employed because it has a larger moderating ratio and a high transmission efficiency. To the output pump 21b, there is fixedly provided a gear 20 which rotates with the pump 21b.

To the crankshaft 15, there are integrally disposed a first crankshaft gear 23, which includes an electromagnetic clutch 22 thereinside and the transmission of whose rotation is cut off by the clutch 22, and the second crankshaft gear 24. The second crankshaft gear 24 is engaged via a reverse idle gear 29 with a second intermediate gear 27 which includes a one-way clutch 26. The second intermediate gear 27 is connected to input-output gear 20 via a first intermediate gear 28 which is disposed on the same axis as the gear 27 is disposed, and connected to the gear 27 via non-stage transmission mechanism 95. Accordingly, the first crankshaft gear 23 and the first intermediate gear 28 are connected to each other when the electromagnetic clutch 22 is turned on, that is to say, when said electromagnetic clutch switch 43 is turned on, so that the rotative driving force is transmitted from the crankshaft 15 to said gear 20. In this case, the rotative force is not transmitted between the second intermediate gear 27 and the idle gear 29 due to the one-way clutch 26, which rotates freely.

The gear ratios of first crankshaft gear 23, the idle gear 29, the first intermediate gear 28, and the gear 20 are determined in a manner such that the gear ratio between the first crankshaft gear 23 and the gear 20 is small in comparison with that between the gear 20 and the second crankshaft gear 24. This design prevents the power turbine from overrunning when the driving power is transmitted from the crankshaft 15 to the power turbine 12 with the engine being run at its rated revolution speed. In this particular embodiment, the gear ratio between the first crankshaft gear 23 and the first intermediate gear 28 is smaller than that between the second crankshaft gear 24 and the second intermediate gear 27.

The first crankshaft gear 23, the first intermediate gear 28, and the input-output gear 20 are comprised in a first gear train which transmits the rotative power from the power turbine 12 to the crankshaft 15, while the second crankshaft gear 24, the idle gear 29, the second intermediate gear 27, the one-way clutch 26 and the gear 20 are comprised in another gear train which transmits the rotation power from the crankshaft 15 to the power turbine 12.

Figure 2:
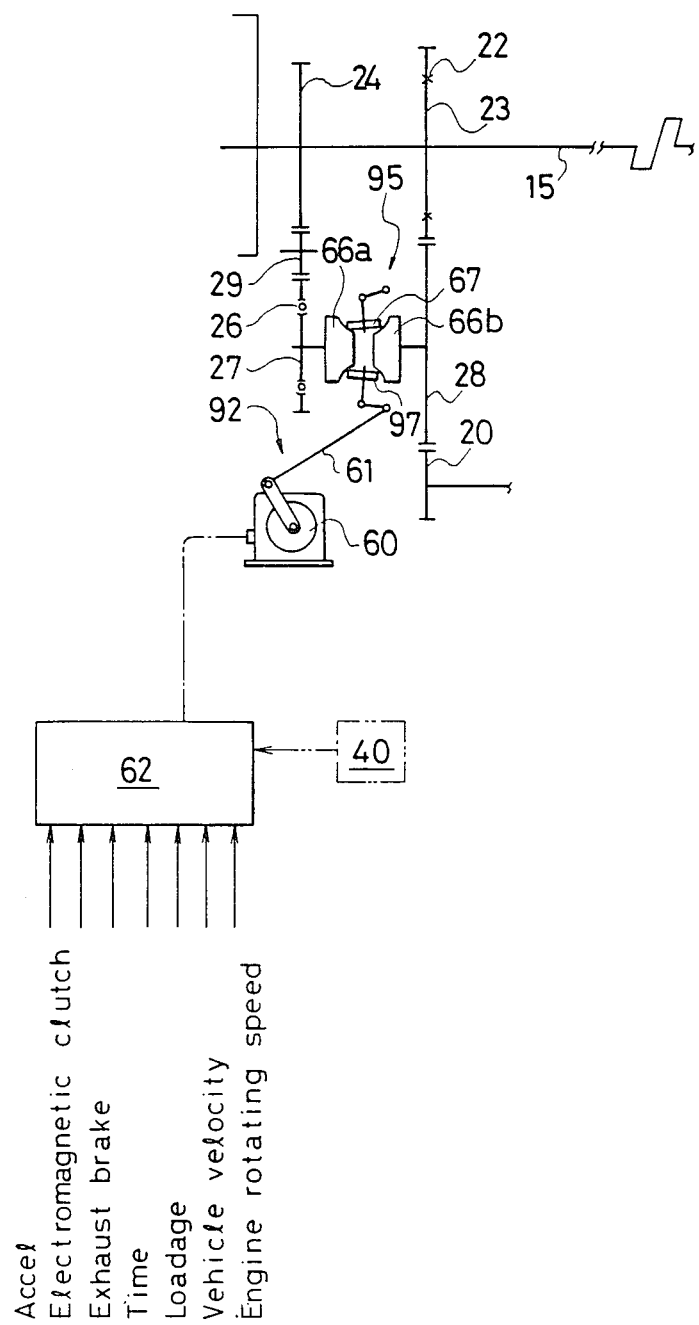
FIG. 2 is an enlarged view of a part of FIG. 1, showing a non-stage transmission mechanism that enables the change of the revolution speed transmitted to the power turbine and a controller for controlling the non-stage transmission mechanism.

In the illustrated embodiment, as seen in FIGS. 1 and 2, the non-stage transmission mechanism 95 is provided so as to connect on the same axis the second intermediate gear 27 and the first intermediate gear 28.

The non-stage transmission mechanism 95 includes: conical friction wheels 66a and 66b disposed integrally at the protruding ends of shafts of the second and first intermediate gears 27 and 28, respectively; idlers 67 and 97 having contact points with the circumferential surfaces of the facing friction wheels 66a and 66b respectively so as to transmit the rotative driving power from one friction wheel to the other; a linking mechanism 92 for moving said contact points so that the pitch diameter of each friction wheel changes by non-stage; and an actuation device for driving the linking mechanism 92 based on the command from a controller 62 which is described later.

In this embodiment, a step motor 60 is employed as the actuation device, though any device is satisfactory as long as it is able to change the stroke of the linkage 61 as well as the contact points on the idlers 67 and 97.

Now, the construction and the control of the controller 62 will be explained.

As illustrated in FIG. 1, the vehicle speed, engine revolution speed, loadage, and the time are fed to the input of the controller 62. Measuring the elapsed time starts once the idler 67 of the non-stage transmission mechanism 95 is moved to a proper position by the step motor 60, with the measured time being fed to the controller 62 as its input signal. Also, to the input of the controller 62, an ON-OFF signal of the exhaust brake switch 43, an ON-OFF signal of the electromagnetic actuation switch 42, an ON-OFF signal of an accelerator (not shown), and an ON-OFF signal of the electromagnetic valve 40 are fed as input signals. The output of the controller 62 is connected to the controller of the step motor 60.

As depicted in FIGS. 1-5, the controller 62 has already stored various data of characteristics in maps 63, 64, 65, 66, and 67, acquired by experiments conducted beforehand. The controller 62 performs comparison operations between the stored data in the maps 63–67 and the input data, and then the control of the step motor 60 is conducted.

Referring to FIG. 5, the control of the controller 62 will be described.

First, the control during normal driving will be explained.

In the controller 62, the program proceeds to the step 73 at which the control for normal driving is performed if the exhaust brake switch 42 is OFF at the step 68, the clutch actuation switch 42 is OFF at the step 69, or the accelerator switch is OFF at the step 70. When the exhaust brake switch 43 is OFF, as illustrated in FIGS. 1 and 3, the electromagnetic valve 40 is OFF. Hence, the exhaust passage 4d just upstream of the power turbine 12 and the exhaust passage 4b upstream of the rotary valve 31 are connected to each other via the first port A. The exhaust gas from the engine 1 is led through the exhaust manifold 3 into the exhaust passage 4a so that the energy of the exhaust gas is recovered by the turbine 10a of the turbocharger 10. The turbine 10a drives the compressor 10b disposed on the same axis thereof so that the supercharged air is supplied into the cylinders of the engine 1. The exhaust gas which is passed through the turbine 10a of the turbocharger 10 gives rotative power to the power turbine 12. This means that the energy of the exhaust gas is recovered by the power turbine 12. At this time, since the electromagnetic clutch 22 is OFF, the exhaust gas energy recovered by the power turbine 12 is transmitted to the first crankshaft gear 23 via the gear 20 and the first intermediate gear 28. During this transmission, the rotation speed is reduced at the planetary gear 29. In short, the rotative power caught by the power turbine 12 is transmitted to the crankshaft 15 and effectively utilized as a rotative power.

Now referring back to FIG. 5, the control during exhaust braking will be explained.

When all the answers at the steps 68, 69, and 70 are YES, the control for exhaust braking is performed.

During exhaust braking, the neutrality sensing switch 41, the clutch actuation switch 42, the accelerator switch, and the exhaust brake switch 43 are all ON. In this case, the electromagnetic clutch switch 47 is turned ON at that step 71, turning the electromagnetic valve 40 ON, so as to supply the working fluid from the fluid feeding apparatus 36 to the actuation chamber 37 of the actuator 34. In other words, the step 72 is performed so that the actuation rod 33 drives the rotary valve 31 via the lever member 35, closing the exhaust passage 4b so as to let the exhaust passage 4d downstream of the rotary valve 31 communicate with the fluid passage 25 via the second port B. Then, the vehicle velocity is detected at the step 74.

Therefore, the rotative power from the exhaust gas is not supplied to the power turbine 12 while the driving force of the crankshaft 15 is transmitted to the gear 20 and the fluid coupling 21 through the second crankshaft gear 24, the idle gear 29, and the second intermediate gear 27. In other words, the power turbine 12, as shown in FIG. 4, is rotated in reverse sense so that it functions as a compressor of low efficiency which feeds the air from the exhaust passage 4c downstream of the power turbine 12 to the junction of the fluid passage 25. The speed of the air is accelerated when it passes through the second port B because it is throttled. The air mixing work and the compressing work by the power turbine 12 serve as a large negative work against the braking force which includes the above-mentioned negative work, another negative work by the exhaust braking, and the friction produced by the engine. This engine braking force is suitable in terms of magnitude, i.e., it does not apply an undue load to the driving system of the vehicle at one time. The exhaust brake system includes an exhaust brake valve (not shown) disposed in the downstream of the exhaust manifold 3, and produces a braking effort by actuating this valve. When the exhaust brake valve is fully closed, a resistance force against the exhaust gas is increased so that the pumping work is increased. Hence, an engine braking force is increased by the exhaust brake valve. Here, the diameter of the second port B, d2, is determined in accordance with the configuration of the power turbine, and most preferably it is determined in a manner such that the power turbine 12 will not go into an overrun condition (see FIGS. 3 and 4).

The controller 62 then detects the vehicle velocity at the step 74. The detected velocity is compared with the value stored in the map 63 at the step 75. Thus, an optimum reduction radio Do relative to the vehicle velocity is obtained. At the step 76, the loadage of the vehicle is detected, and at the step 77 an optimum reduction ratio DT relative to the thusly detected loadage is obtained from the map 64. The step 78 determines which has priority, the optimum reduction ratio Do or DT. Specifically, if DT<Do, that is to say, if the optimum reduction ratio relative to the loadage is smaller than that relative to the vehicle velocity, the optimum reduction ratio DT becomes the value of Do. If DT>Do at the step 78, Do is chosen as the optimum reduction ratio. In a word, the reduction ratio is controlled to have the minimum value.

The controller 62 detects the engine revolution speed at the step 79, and at the step 80 an optimum reduction ratio DE relative to the detected engine revolution speed is obtained from the map 65. After that, it is determined which has priority, DE or Do at the step 81. If DE<Do, the value of DE is assigned to that of Do, while if DE>Do, the value of Do is chosen as the optimum reduction ratio.

The controller 62 checks the time passage since the step motor 60 has been activated at the step 82. At the step 83, an optimum reduction ratio DM and the time to maintain the optimum reduction radio DM are determined from the map 66 based on said time. Then, it is determined which has priority, Do or DM at the step 84. IF DM<Do, the value of DM is assigned to Do, while if DM>Do, the value of Do comes out from the step 84. The thusly obtained Do is the final optimum reduction ratio, and the movement of the step motor 60 relative to Do, namely the moving angle (step angle) of the step motor 60 is determined at the step 85. At the step 86, the step motor 60 is activated according to the thusly determined moving angle.

Here, at the steps 78, 81, and 84, the minimum optimum reduction ratio Do is determined by judging the priority, with respect to parameters, i.e., the vehicle velocity, loadage, the engine revolution speed, and the time as parameters, so that a large exhaust brake force does not exert on the driving systems of the engine and the vehicle at one time. If the circumstance still demands the exhaust brake force, the judgment is performed at the step 87. When the answer is YES, the program returns to the step 74 and repeats the above described procedure until the step 85, whereby the optimum and minimum exhaust brake force is cyclically applied based on the driving condition of the vehicle. Hence, during exhaust braking, a large driving power is not applied to the driving system of the vehicle, the skidding and the abnormal wear of the brake pads and shoes are prevented, and the shock to the vehicle is reduced.

In this embodiment, it is acceptable to dispose a three-way valve 55 in the exhaust passage 4c near the junction 4e of the exhaust passage 4c downstream of the power turbine 12 and the fluid passage 25. This construction makes it possible during exhaust braking to close the exhaust passage 4c and directly introduce the external atmosphere cleaner than the exhaust gas.

In the illustrated embodiment, the switching between the exhaust passage 4 and the fluid passage 24 is executed by the rotary valve 31. However, it is not limited to the rotary valve. For instance, when the driving rotation of reverse sense is transmitted from the crankshaft 15 to the power turbine 12 during exhaust braking, it is permissible to provide an opening-closing valve and a throttling valve in a manner such that the opening-closing valve opens the exhaust passage 4b upstream of the fluid passage 25 and the throttling valve converges the fluid passage 25. It is also satisfactory to form a converging portion in the fluid passage 25 to a certain degree beforehand, and to open and close the exhaust passage 4b upstream of the fluid passage 25.

What is claimed is:

1. A turbo compound engine for use in a vehicle, comprising:
    an exhaust brake system which includes a vehicle being driven by an engine through a crankshaft, said vehicle having an accelerator and a clutch, said engine having an exhaust gas passage;
    an engine neutrality sensing switch for sensing if said accelerator is free;
    a clutch engagement sensing switch for sensing if said clutch is engaged;
    an exhaust brake valve disposed in said exhaust gas passage of said engine;
    an exhaust brake switch for activating said exhaust brake valve to throttle said exhaust gas passage;
    a power turbine disposed in said exhaust gas passage downstream of said exhaust brake valve;
    two sets of gears for independently connecting said power turbine with said crankshaft, a first set being selected when said engine neutrality sensing switch, said clutch engagement sensing switch and said exhaust brake switch are all turned on, said first set causing said crankshaft to transmit rotational energy to said power turbine and a second set being selected at all other times causing said power turbine to transmit rotational energy to said crankshaft;
    speed change means associated with said first set for adjusting the transmission speed that said crankshaft drives said power turbine at; and
    control means for detecting an engine revolution speed and for controlling said speed-change means in a manner such that said power turbine does not rotate at a revolution speed higher than a desired value, said desired value being a predetermined value retained in said control means.

2. The turbo compound engine according to claim 1, wherein said gear train includes a clutch for connecting and disconnecting said crankshaft and said power turbine.

3. The turbo compound engine according to claim 1, wherein said gear train includes two shafts extending horizontally and facing each other, and said speed-change means includes: conical friction wheels disposed at ends of said shafts of said gear train, idlers for adjusting the friction transmission points on the circumferential surfaces of the conical friction wheels so as to change the transmitting revolution speed from one conical friction wheel to the other, and a linkage mechanism for activating said idlers in accordance with said controller.

4. The turbo compound engine according to claim 1, wherein said controller receives the latest data of loadage of the vehicle which is utilized within a map of loadage-reduction ratio of said gear train to determine a reduction ratio of said gear train, and said speed-change means is controlled based on the reduction ratio resulting therefrom, said data of loadage being consecutively supplied to the controller during exhaust braking of the vehicle, and the map being stored in the controller.

5. The turbo compound engine according to claim 1, wherein said controller receives the latest data of engine revolution speed which is utilized in a map of engine revolution speed-reduction ratio of said gear train to determine a reduction ratio of said gear train, said speed-change means being controlled based on the reduction ratio resulting therefrom, said data of engine revolution speed being consecutively supplied to the controller during exhaust braking, and the map being stored in the controller.

6. The turbo compound engine according to claim 1, wherein said controller receives the latest data of time which is utilized in a map of time-reduction ratio of said gear train to determine a reduction ratio of said gear train, said speed-change means being controlled in accordance with the reduction ratio resulting therefrom, said data of time being consecutively supplied to the controller during exhaust braking of the vehicle, and the map being stored in the controller.

7. The turbo compound engine according to claim 1, wherein said controller is constructed to receive the latest data about vehicle velocity, loadage, engine revolution speed, and time to be utilized in the map of vehicle velocity-reduction ratio of said gear train, the map of loadage-reduction ratio of said gear train, the map of engine revolution speed-reduction ratio of said gear train, respectively, in order to determine a minimum reduction ratio for said gear train, said speed-change means being controlled in accordance with the determined minimum reduction ratio, said data being consecutively supplied to the controller during exhaust braking of the vehicle and all the maps being stored in the controller.

8. A vehicle drive comprising:
a vehicle having an engine, said engine driving a crankshaft, said engine having exhaust gas, an exhaust gas passage receiving exhaust gas from said engine;
a rotor selectively connected to be driven as a turbine by said exhaust gas;
a valve selectively operable to connect said exhaust gas to drive said rotor;
a gear train interconnecting said rotor and said crankshaft, said gear train being selectively operable to either connect said rotor to drive said crankshaft or connect said crankshaft to drive said rotor;
control means controlling the selective operation of said valve and said gear train, said control means sensing at least one vehicle condition to determined whether it is desired to increase or decrease a rotational speed of said crankshaft, said control means connecting said rotor to being driven by said exhaust gas and drive said crankshaft when it is determined that an increase in rotational speed is desired, said control means causing said rotor to be driven by said crankshaft when it is determined that a decrease in rotational speed is desired.

9. A turbo compound engine for use in a vehicle comprising:
an engine driving a crankshaft, said engine having an exhaust gas passage for exhaust gas;
a turbine rotor selectively connected to be driven by said exhaust gas in said exhaust gas passage;
a gear train interconnecting said turbine rotor and said crankshaft, said gear train being selectively operable to connect said turbine rotor to drive said crankshaft, said gear train further being selectively operable to connect said crankshaft to drive said turbine rotor;
said gear train being operable to connect said turbine to drive said crankshaft when said turbine rotor is connected to be driven by said exhaust gas, said gear train being operable to connect said crankshaft to drive said turbine rotor when said turbine rotor is not being driven by said exhaust gas, a speed change means controlling the relative speeds of said crankshaft and said turbine rotor when said turbine rotor is being driven by said crankshaft;
controller means for controlling the selective operation of said gear train and the selective connection of said exhaust gas to said turbine rotor; and wherein when it is desired to drive said turbine rotor said control means receives the latest data of vehicle velocity which is compared to a map of vehicle velocity reduction ratios of said gear train in order to determine a reduction ratio of said gear train, said speed-change means is controlled by the reduction ratio resulting therefrom, said data being supplied to, said control means during exhaust braking of said vehicle, with said map being predetermined and stored in said control means.

* * * * *